United States Patent [19]

Kihara

[11] 3,925,816

[45] Dec. 9, 1975

[54] MAGNETIC RECORDING SYSTEM WITH OVERLAPPING TRACKS OF HIGH AND LOW FREQUENCY INFORMATION

[75] Inventor: Nobutoshi Kihara, Tokyo, Japan

[73] Assignee: Sony Corporation, Tokyo, Japan

[22] Filed: July 2, 1973

[21] Appl. No.: 375,465

Related U.S. Application Data

[63] Continuation of Ser. No. 840,283, July 9, 1969, abandoned.

[30] Foreign Application Priority Data

July 10, 1968 Japan ................................ 43-48254

[52] U.S. Cl. ........................ 360/19; 358/4; 360/33; 360/66

[51] Int. Cl.[2] ............................................ H04N 5/79

[58] Field of Search ....... 178/6.6 A; 179/100.2 MD, 179/100.2 B, 100.2 D, 100.2 C; 360/19, 33, 66; 358/4

[56] References Cited

UNITED STATES PATENTS

| | | | |
|---|---|---|---|
| 3,013,123 | 12/1961 | Camras | 179/100.2 C |
| 3,032,612 | 5/1962 | Goldmark | 179/100.2 MD |
| 3,070,670 | 12/1962 | Eldridge | 179/100.2 MD |
| 3,099,709 | 7/1963 | Barry | 178/6.6 A |
| 3,234,323 | 2/1966 | Kihara | 178/6.6 A |
| 3,278,678 | 10/1966 | Rank | 178/6.6 A |
| 3,283,085 | 11/1966 | Lemke | 178/6.6 A |
| 3,542,946 | 11/1970 | Warren | 178/6.6 A |

*Primary Examiner*—Raymond F. Cardillo, Jr.
*Attorney, Agent, or Firm*—Lewis H. Eslinger; Alvin D. Sinderbrand

[57] ABSTRACT

In a magnetic recording and reproducing apparatus in which first and second signals, such as, the chrominance and luminance signals of a color television signal, are recorded by first and second magnetic heads in respective first and second tracks traced thereby on a magnetic recording tape, the first and second tracks are made to overlap, at least partly, so as to increase the utilization of the tape, and the signals to be recorded are given substantially different frequencies to permit their reproduction without interference from each other. In order to further avoid interference between the signals recorded in the overlapped tracks, the core gap of the head for recording and reproducing the relatively low frequency signal is made wider than the core gap of the other head, and the latter core gap extends transversely at right angles to the longitudinal direction of its respective track while the relatively wide core gap extends obliquely with respect to its track.

2 Claims, 10 Drawing Figures

INVENTOR.
NOBUTOSHI KIHARA
BY
ATTORNEY

INVENTOR.
NOBUTOSHI KIHARA
BY
ATTORNEY

MAGNETIC RECORDING SYSTEM WITH OVERLAPPING TRACKS OF HIGH AND LOW FREQUENCY INFORMATION

This is a continuation of application Ser. No. 840,283, filed July 9, 1969, now abandoned.

This invention relates generally to magnetic recording and reproducing apparatus, and more particularly is directed to improvements in magnetic tape recording and reproducing apparatus of a type that is suitable for recording and reproducing a color television signal.

It has been proposed heretofore to provide a magnetic tape recording and reproducing apparatus particularly suited for recording color television signals, and in which a brightness or luminance signal, hereinafter referred to as the Y signal and a chrominance signal, hereinafter referred to as the C signal, for example, the I and Q modulated signal components of the color television signal, are separated from each other and then recorded magnetically by means of individual recording channels leading to separate recording heads that trace spaced apart record tracks on the magnetic tape. The foregoing arrangement has the advantage that the several components of the individual recording and reproducing channels may be designed so as to be particularly suited for the frequency bands of the respective luminance and chrominance signals, as distinguished from the situation in which the luminance and chrominance signals are recorded and reproduced by common channels, so that the head and other components of the common channel then need to be designed for a very wide frequency band.

However, when the luminance and chrominance signals are separately recorded in respective tracks which are spaced from each other, as aforesaid, it is apparent that the utilization of the magnetic tape is correspondingly decreased, that is, the duration of the color television signal that can be recorded in a particular length of tape is reduced.

Accordingly, it is an object of this invention to provide an apparatus for the magnetic recording and reproducing of a plurality of different signals in individual tracks, so as to be particularly suited for recording and reproducing the luminance and chrominance signals of a color television signal, and wherein the utilization of the magnetic tape is increased without resultant interference between the signals recorded in, and reproduced from the respective tracks.

In accordance with an aspect of this invention, in a magnetic recording and reproducing apparatus in which first and second signals, such as, the chrominance and luminance signals of a color television signal are recorded by first and second magnetic heads in respective first and second tracks traced thereby on a magnetic recording tape, such first and second tracks are made to overlap, at least partly, so as to increase the utilization of the tape, and the signals to be recorded are given substantially different frequencies to permit their reproduction without interference from each other.

In order to further avoid interference between the signals recorded in the overlapped tracks on the magnetic tape, it is a feature of this invention to provide the head for recording and reproducing the relatively low frequency signal with a core gap which is substantially wider than the core gap of the other head.

It is still another feature of this invention to provide the head which records and reproduces the relatively high frequency signal with its core gap extending transversely at right angles to the longitudinal direction of its respective track, while the core gap of the head for recording and reproducing the relatively low frequency signal extends obliquely with respect to its track.

The above, and other objects, features and advantages of this invention will be apparent in the following detailed description of illustrative embodiments thereof which is to be read in connection with the accompanying drawings, wherein:

Figs. 5A and 5B are graphic representations of the signals respectively recorded by the two heads of the apparatus according to this invention;

Figure 1:
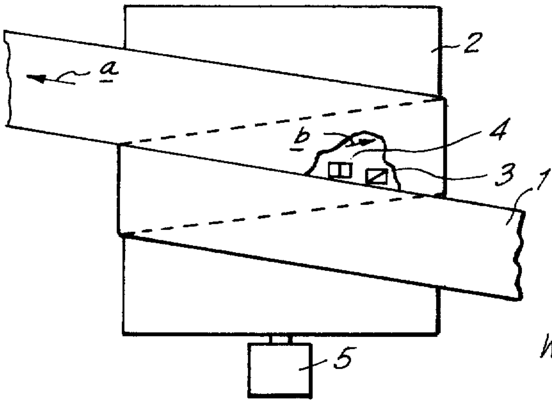
FIG. 1 is a schematic elevational view of a portion of a magnetic recording and reproducing apparatus in accordance with an embodiment of this invention.
Figure 2:
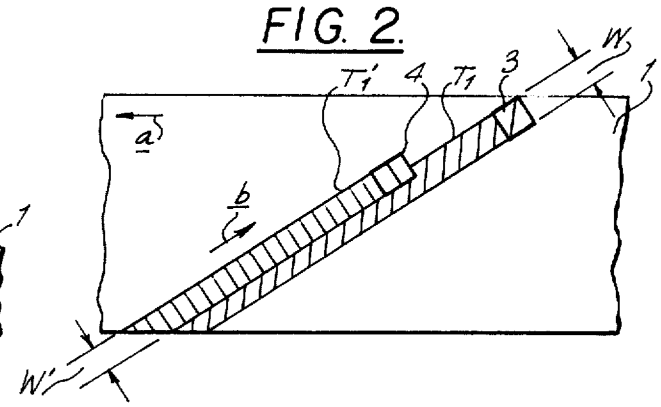
FIG. 2 is an enlarged diaagrammatic view showing one set of tracks traced on the magnetic tape by the two heads of the arrangement appearing on FIG. 1.
Figure 8:
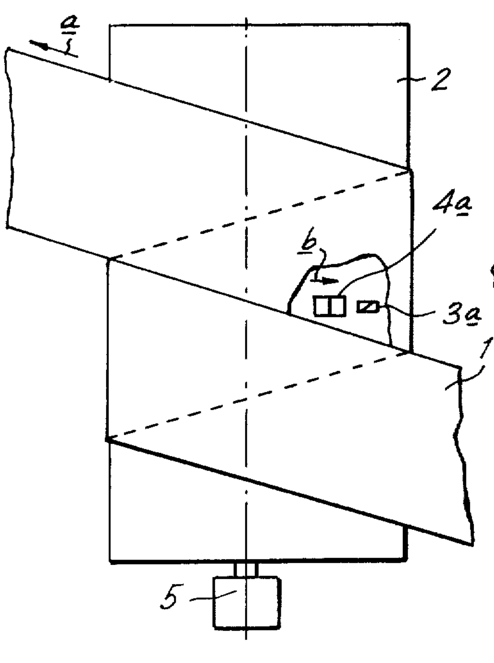
Figure 9:
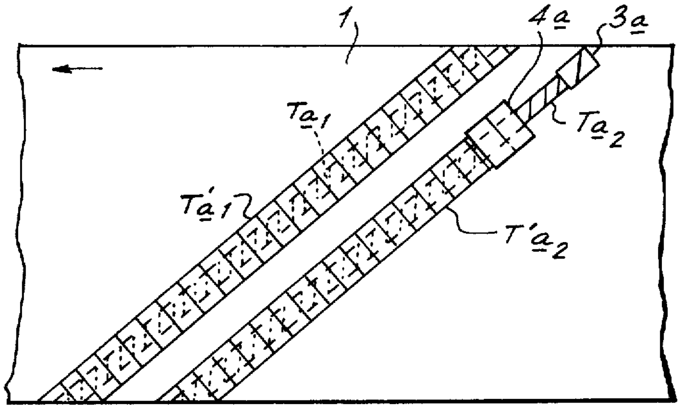
Figure 6:
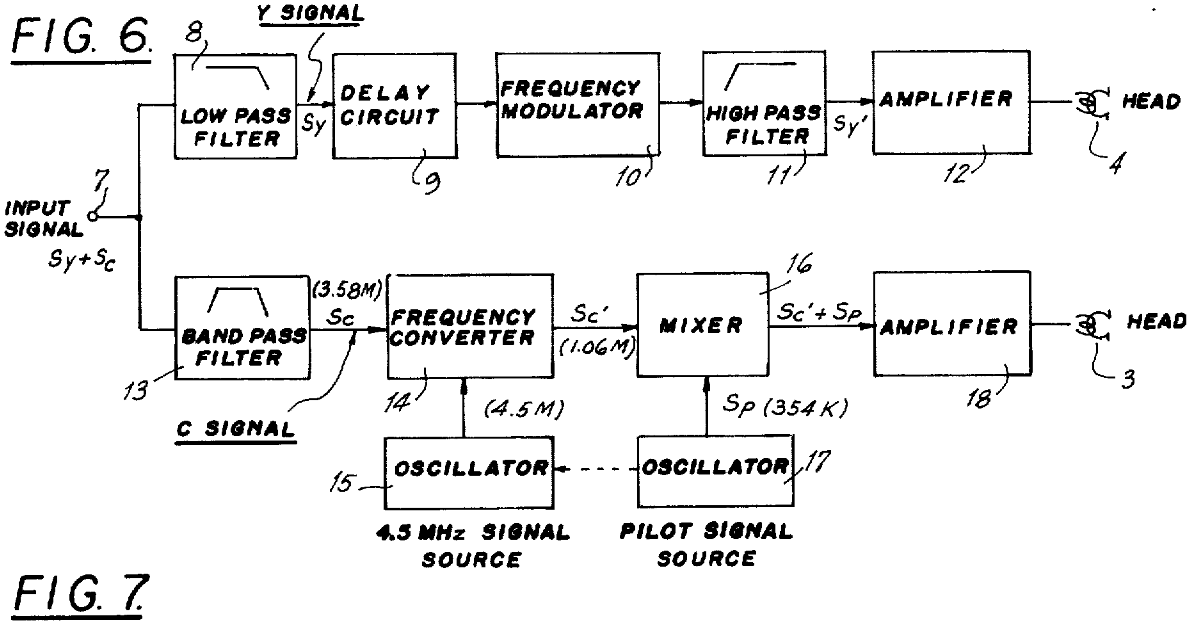
Figure 7:
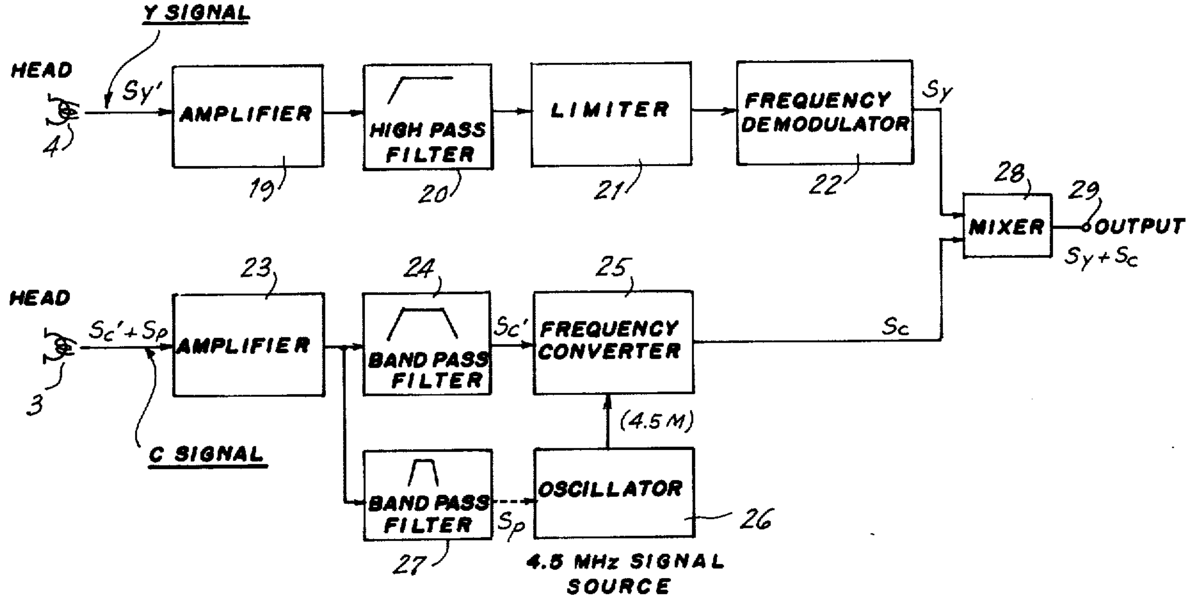
Figure 7:
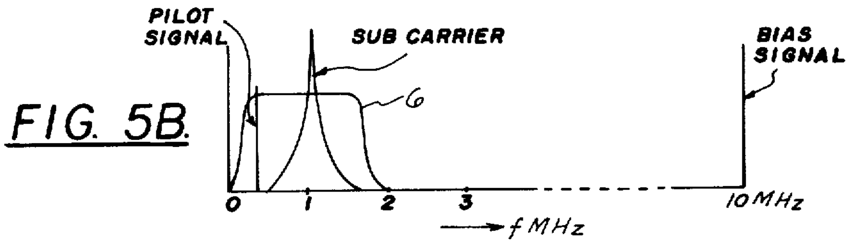

FIGS. 6 and 7 are block circuit diagrams respectively illustrating recording and reproducing circuits that may be employed in connection with the recording and reproducing heads of the apparatus according to this invention; and FIGS. 8 and 9 are views similar to FIGS. 1 and 2, respectively, but showing an arrangement according to another embodiment of this invention.

Referring to the drawings in detail and initially to FIG. 1 thereof, it will be seen that, in an embodiment of this invention as there illustrated, a magnetic tape 1 is wound or wrapped helically through 360° around a guide drum 2, that is, in a so-called $\alpha$ winding, and the tape 1 is suitably advanced longitudinally, as by a capstan or drive roller (not shown), in the direction of the arrow *a*. Two independent magnetic heads 3 and 4 are mounted on drum 2 with a predetermined spacing between the heads, and the heads 3 and 4 are operative to record respective signals on tape 1 and to reproduce such signals from the tape. The guide drum 2 and magnetic heads 3 and 4, which may be disposed in recesses in the surface of the drum so as to project slightly beyond such surface, are rotated about the central axis of drum 2, as by a motor 5, to move heads 3 and 4 in the direction of the arrow *b* in circular paths that extend obliquely with respect to the longitudinal axis of tape 1 wound on the drum.

It will be apparent that, when tape 1 is longitudinally advanced in the direction *a* and drum 2 is simultaneously rotated to move heads 3 and 4 circumferentially therearound in the direction *b*, heads 3 and 4 repeatedly trace tracks extending obliquely across tape 1 at an angle to the longitudinal axis of the tape that is determined by the speed of advance of the tape and by the rotational speed of the drum. As is shown on FIG. 1, head 3 is disposed on drum 2 in advance of head 4 considered in the direction of their movement indicated by the arrow *b*, and thus head 3 will trace its track $T_1$ (FIG. 2) on tape 1 in advance of the tracing of track $T'_1$ by the head 4.

Figure 3:
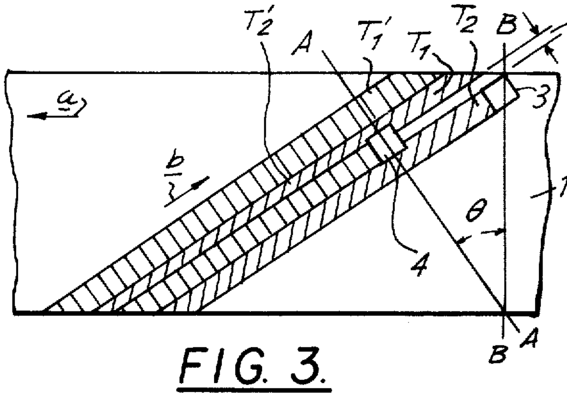
FIGS. 3 and 4 are diagrammatic views similar to that of FIG. 2, but showing the succession of tracks traced in sequence on the magnetic head.
Figure 4:
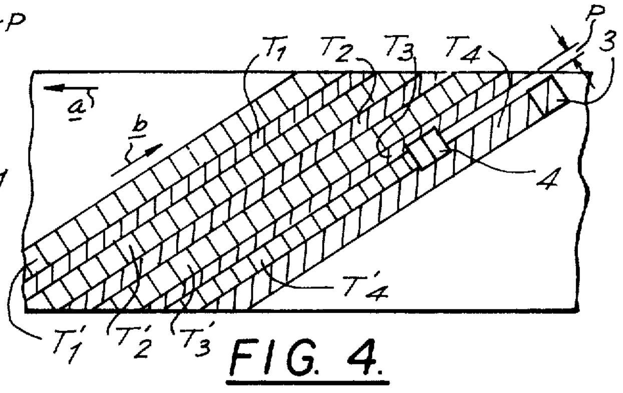

In accordance with this invention, the positioning of heads 3 and 4 relative to each other in the direction of the axis of rotation of drum 2 is selected so that track $T'_1$ traced on the tape by head 4 will at least partly overlap the track $T_1$ traced by head 3, as shown on FIG. 2. During the revolution of drum 2 following that in which head 3 traces track $T_1$, head 3 traces a track $T_2$ (FIG. 3) that is parallel to track $T_1$ and spaced from the latter by a distance P and, simultaneously, head 4 traces a track $T'_2$ that is disposed between tracks $T_1$ and $T_2$ and in partly overlapping relation to the latter. Thus, as shown on FIG. 4, during successive revolutions of drum 2, head 3 traces tracks $T_1$, $T_2$, $T_3$, $T_4$ . . . spaced from each other by the distance P, and head 4 traces tracks $T'_1$, $T'_2$, $T'_3$, $T'_4$ . . . between the tracks of head 3 and in overlapping relationship to such tracks.

In FIG. 2, the widths of the tracks traced by heads 3 and 4, that is, the lengths of the core gaps of heads 3 and 4 measured at right angles to the longitudingal direction of the respective tracks, are indicated at W and W', respectively, and the ratio of the distance P between the successive tracks traced by each head and the width W of such tracks, that is, the ratio P/W is preferably selected to be within the range of one-fourth to one-half. The distance P between adjacent tracks traced by either of the heads 3 or 4 is, of course, determined by the speed of advancement of tape 1.

If the arrangement described above with reference to FIGS. 1 to 4 is to be used for recording and reproducing a color television signal, the chrominance signals corresponding to single fields or frames of the picture may be sequentially recorded by the head 3 in tracks $T_1$, $T_2$, $T_3$. . . , while the luminance signals corresponding to the single fields or frames are sequentially recorded by the head 4 in tracks $T'_1$, $T'_2$, $T'_3$ . . . . Since the tracks in which the chrominance signals and the luminance signals are recorded on tape 1 are in overlapping relation to each other, it is apparent that the utilization of the tape is increased, that is, a color television signal of relatively long duration can be recorded in a particular length of tape, as compared with the previously proposed arrangement in which the tracks having the chrominance and luminance signals recorded therein are all spaced from each other.

However, when the signals respectively recorded in tracks $T_1$, $T_2$, $T_3$ . . . and in tracks $T'_1$, $T'_2$, $T'_3$ . . . are reproduced by heads 3 and 4, it will be apparent that head 3 traces not only the tracks $T_1$, $T_2$, $T_3$ . . . in sequence, but also the overlapping portions of the adjacent tracks $T'_1$, $T'_2$, $T'_3$ . . . Therefore, in accordance with this invention, measures are taken to avoid the reproduction by head 3 of the signals recorded in tracks $T'_1$, $T'_2$, $T'_3$ . . . , in addition to the desired reproduction of the signals recorded in the tracks $T'_1$, $T'_2$, $T'_3$ . . . .

Figure 5A:
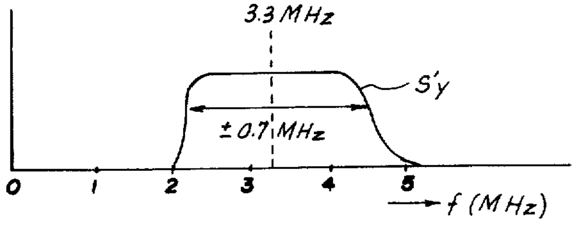

One of the measures taken in accordance with this invention to avoid the above mentioned undesired signal reproduction is to provide the signals respectively recorded by heads 3 and 4 with substantially different frequency bands so that, in reproducing such signals, the reproducing channels associated with heads 3 and 4 can be provided with suitable limiters or filters, as hereinafter described, to pass only the signals desired to be reproduced by the respective heads. Thus, for example, when the apparatus according to this invention is employed for recording and reproducing a color television signal, the sub-carrier of the chrominance signal having a frequency of 3.58 MHz according to NTSC standards is modulated into a chrominance signal with a subcarrier frequency of 1.062 MHz by means of beatdown with a 4.5 MHz signal and has added thereto a pilot signal of 354 KHz, whereupon such modulated or frequency converted chrominance signal with the pilot signal added thereto is recorded sequentially by head 3 in the tracks T, $T_2$, $T_3$ . . . On the other hand, the luminance signal of the color television signal is frequency modulated to have a center frequency of 3.3 MHz and a frequency band of approximately 2.5 to 4.0 MHz, with such frequency modulated luminance signal being recorded by head 4 in tracks $T'_1$, $T'_2$, $T'_3$ . . . As is shown on FIGS. 5A and 5B, the luminance signal to be recorded and reproduced by head 4 is in a relatively high frequency region, whereas the chrominance signal to be recorded and reproduced by the head 3 is in a relatively low frequency region, and the respective heads and the associated recording and reproducing circuits can then be conveniently designed for optimum performance in connection with the respective frequency bands of the signals to be recorded and reproduced thereby. Preferably, in accordance with this invention, the cores of heads 3 and 4 provided with relatively wide and narrow gaps, respectively, so as to be particularly suited for recording and reproducing the low frequency chrominance signal and the high frequency luminance signal, respectively.

Because the frequency band of the luminance signal recorded by head 4 is substantially higher than the frequency of the chrominance signal recorded by head 3, the luminance signal is recorded in portions of tape 1 that are nearer to the surface thereof than the portions of the tape in which the chrominance signal is recorded, and the recording of the luminance signal in the surface portions of the tape is accompanied by erasing of the overlapped parts of the record tracks containing the chrominance signal, particularly in the surface portions of the tape. Thus, during reproduction of the recorded signals, the head 4 reproduces only the luminance signals recorded in the surface portions of the tape by reason of the narrow gap provided in the core of head 4. On the other hand, since head 3 has a relatively wide gap in its core, such head reproduces only the chrominance signals recorded in the relatively deeper portions of the magnetic tape. Thus, the heads 3 and 4 selectively reproduce the chrominance and luminance signals, respectively, and avoid interference of such signals with each other even through the signals are recorded in overlapping tracks.

Further, the signal intensity level with which the chrominance signal is recorded is preferably substantially less than, for example, one-fifteenth, the signal intensity level with which the luminance signal is recorded in order to substantially avoid any cross-talk in the luminance signal reproduced by the head 4. For example, in a practical embodiment of this invention, the frequency modulated luminance signal has a recording current of 50 to 70 mA, the 1.06 MHz subcarrier, that is, the recorded amplitude modulated chrominance signal has a recording current of 3.5 to 10 mA, and the pilot signal which is recorded with the chrominance signal has a recording current of 3 mA.

As a further means to avoid interference between the signals recorded in the overlapping tracks, the gaps of heads 3 and 4 may be made to extend in directions that are angularly displaced with respect to each other. Thus, for example, as shown on FIG. 3, the gap of head 4 may be made to extend in a direction, as indicated at A—A, that is at right angles to the longitudinal direction of each of the tracks traced by head 4, while the gap of head 3 extends in a direction indicated at B—B which is at an acute angle $\theta$ with respect to the direction A—A. It has been determined experimentally that, if the angle $\theta$ is at least 30°, cross-talk or interference between the recorded luminance and chrominance signals will be avoided even if such signals have overlapping frequency ranges and are recorded in overlapping tracks.

Although the invention has heretofore been described with reference to an arrangement in which the tracks traced by heads 3 and 4, and in which the respective signals are recorded, are only partly overlapped, it will be seen on FIGS. 8 and 9 that the invention may also be embodied in an apparatus in which the heads 3*a* and 4*a* thereof are arranged on the rotated drum 2 so that the successive tracks traced by head 3*a*, for example, the tracks $Ta_1$ and $Ta_2$ on FIG. 9, are completely overlapped by the tracks $T'a_1$ and $T'a_2$ traced by head 4*a*. When the signals recorded by heads 3*a* and 4*a* in the respective tracks are made to have different frequencies, as previously described herein, such signals may be reproduced by the heads 3*a* and 4*a* without substantial interference therebetween, and such interference may be further avoided by providing the respective heads with different gap widths and with different gap directions, as described above with reference to the embodiment shown on FIGS. 1 to 4.

As shown on FIG. 6, a suitable recording circuit for use in an apparatus according to this invention may have an input terminal 7 to receive the color television signal including the luminance signal $S_y$ and the chrominance $S_c$, with separate channels extending from such input terminal 7 to the heads 3 and 4. The channel for the luminance signal extending to head 4 may include, in succession, a low pass filter 8 for separating the luminance signal from the input signal, a delay circuit 9 to compensate for the lagging position of head 4 relative to head 3, a frequency modulator 10 for frequency modulating the luminance signal with a center frequency of 3.3 MHz, a high pass filter 11 to pass only the frequency modulated luminance signal $S_{y'}$ and an amplifier 12 feeding such signal to head 4 for recording in the respective tracks. The recording channel for the chrominance signal is seen to include a band pass filter 13 to separate from the input signal the chrominance signal $S_c$ with a subcarrier frequency of 3.58 MHz, a frequency converter 14 in which such subcarrier frequency is beatdown by a 4.5 MHz signal from an oscillator 15 to provide the frequency converted chrominance signal $S_{c'}$ with a subcarrier frequency of 1.06 MHz, a mixer 16 in which the frequency converter signal $S_{c'}$ has added thereto the pilot signal $S_p$ from an oscillator 17, and an amplifier 18 by which the combined signal ($S_{c'} + S_p$) is fed to head 3 for recording in the respective tracks.

During reproduction of the signals recorded in the respective tracks, the heads 3 and 4 are suitably disconnected from the recording circuit of FIG. 6 and connected to respective channels of the reproducing circuit shown on FIG. 7. As shown, the reproducing channel for head 4 may contain, in succession, an amplifier 19, a high pass filter and limiter 20 and 21, and a frequence demodulator 22 from which there issues the reproduced luminance signal $S_y$. Further, as shown, the reproducing channel for the head 3 may include, in sequence, an amplifier 23, a band pass filter 24 having a characteristic represented by the curve 6 on FIG. 5B so as to pass the modulated chrominance signal $S_{c'}$ to a frequency converter 25 in which the subcarrier frequency is returned to 3.58 MHz by means of a 4.5 MHz signal from an oscillator 26 which is under the control of the pilot signal $S_P$ passed by a band pass filter 27. The chrominance signal $S_c$ at the output of frequency converter 25 is then combined with the luminance signal $S_y$ from frequency demodulator 22, as in a mixer 28, to provide the desired reproduced color television signal ($S_y + S_c$) at the output terminal 29.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. In a magnetic recording and reproducing apparatus, the combination of guiding means for guiding a magnetic tape, first and second magnetic recording and reproducing heads moved relative to said tape adjacent a surface of the tape for respectively tracing first and second parallel tracks on said tape with said second track overlapping only a portion of said first track with said first head preceding said second head in the relative movement of said hands with respect to said tape, said second head having a core gap extending transversely at right angles to the longitudinal direction of said second track, said first head having a core gap that is substantially wider than the core gap of said second head and extending transversely across said first track at an acute angle with respect to the direction of said core gap of the second head, recording circuit means operable to apply a first signal to said first head for recording by the latter in said first track to a substantial depth in said tape from said surface of the latter and to apply to said second head a second signal having a substantially higher frequency than said first signal for recording of said second signal in said second track only adjacent said surface of the tape, whereby said second signal erases only so much of said first signal as appears adjacent said surface of the tape in the overlapping portions of said first and second tracks, and reproducing circuit means operable to cause said first and second heads to reproduce said first and second signals recorded in said first and second tracks, respectively, at a substantial depth from said surface and adjacent said surface, respectively.

2. A magnetic recording and reproducing apparatus according to claim 1, in which said acute angle is at least 30°.

* * * * *